Patented July 15, 1947

2,424,063

UNITED STATES PATENT OFFICE 2,424,063

2-METHOXY-6-CHLORO-9-[2'-HYDROXY-3'-(ETHYL - N - BUTYLAMINO) - PROPYL - AMINO]-ACRIDINE

Horace A. Shonle and Joseph W. Corse, Indianapolis, Ind., assignors to Eli Lilly and Company, Indianapolis, Ind., a corporation of Indiana No Drawing. Application August 7, 1944, Serial No. 548,499

1 Claim. (Cl. 260—279)

This invention relates to certain new 2-methoxy-6-chloro-9-[2' - substituted-3'-(disubstituted amino) propylamino]acridines, and their salts, having antimalarial value; to certain new intermediates used in making them; and to the process of making these new compounds.

These new substituted acridines have the following general formula:

(1)
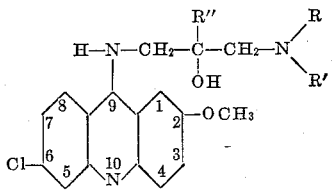

in which R and R' are different saturated atertiary (primary or secondary) hydrocarbon radicals, the sum of the carbon atoms in R and R' does not exceed 10, and R'' is a member of the class consisting of hydrogen and the methyl radical.

Examples of hydrocarbon radicals which R and R' may represent are the following:

Methyl
Ethyl
n-Propyl, isopropyl, and cyclopropyl
n-Butyl, its atertiary isomers, and cyclobutyl
n-Pentyl, its atertiary isomers, and cyclopentyl
n-Hexyl, its atertiary isomers, and cyclohexyl
n-Heptyl, its atertiary isomers, and cycloheptyl Our general process for preparing our substituted acridines is as follows:

1. We prepare, or obtain, a secondary amine having the following general formula:

(2)

in which R and R' have same significance as in Formula 1.

In some cases such substituted amines are known. In other cases, they are new, and are described and claimed in co-pending patent applications of one of us (Shonle) and Ewald Rohrmann. They may be prepared by reacting a primary amine containing one desired R or R' substituent with hydrogen and an aldehyde or ketone having the carbon skeleton of the other desired R or R' substituent, under pressure and in the presence of a catalyst such as Raney nickel, and by purifying the resulting secondary amine by known methods.

2. From this secondary amine, we prepare a diamine of the following formula:

(3)
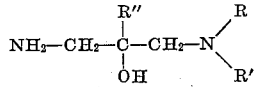

in which R, R', and R'' have the same significance as in Formula 1. These diamines may be prepared as follows: The desired secondary amine is mixed with an epichlorohydrin—1-chloro-2,3-epoxypropane—or β-methylepi-chlorohydrin—1-chloro-2-methyl-2,3-epoxypropane—in a suitable solvent, such as methoxyethanol ("Methyl-Cellosolve"), and the mixture is allowed to stand for several hours. A solution of potassium phthalimide and sodium iodide in a suitable solvent such as methoxyethanol is then added, and the whole is heated and stirred for several hours. This yields a substituted propylphthalimide, which is separated and hydrolyzed, to produce the desired 2-substituted - 3 - (disubstituted amino)propylamine of Formula 3.

4. This diamine is then condensed with 2-methoxy-6,9-dichloroacridine in phenol, to produce the desired substituted acridine of Formula 1. This is liberated by making the reaction mixture alkaline; and may be recovered by extraction with ether. It may be converted to a salt; for example its dihydrochloride is precipitated by treating the ether solution with hydrogen chloride.

The following are examples of our new products, and of the process of making them:

*Example 1.*—2 - methoxy - 6 - chloro-9-[2'-hydroxy-2'-methyl - 3' - (methyl - n - propylamino) propylamino]acridine, and its dihydrochloride.

A solution of 36.5 g. of methyl-n-propylamine in 50 cc. of methoxyethanol is added to a solution of 53 g. of β-methylepichlorohydrin in 50 cc. of methoxyethanol with cooling. The resulting solution is permitted to stand overnight, and a solution of 92.5 g. of potassium phthalimide and 5 g. of sodium iodide in 100 cc. of methoxyethanol is added to it. The mixture is stirred and heated on an oil bath at about 130° C. for 5½ hours. The solvent is removed by distillation and the residue is dissolved in dilute hydrochloric acid. This solution is filtered, and then made basic with sodium hydroxide solution. A precipitate forms, which is crude 2-hydroxy-2-methyl-3-(methyl-n-propylamino) propylphthalimide. This is separated, in a yield of 62 g.

This crude phthalimide is then dissolved in 250 cc. of absolute alcohol, 12 g. of 85% hydrazine hydrate is added, and the solution is permitted to stand for four hours. Dilute hydrochloric acid is then added. A precipitate forms, which is removed by filtration. The filtrate is evaporated to dryness, and a 12.5 N solution of sodium hydroxide is added to the residue. This liberates an oil, which consists essentially of 2-hydroxy - 2 - methyl - 3 - (methyl-n-propylamino) propylamine, which has the following formula:

(4)
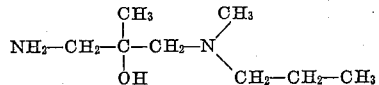

A mixture of 9 g. of this crude diamine, 14 g.

of 2-methoxy-6,9-dichloroacridine, and 50 cc. of phenol is heated and stirred in an oil bath at 100° C. for two hours. The reaction mixture is made basic with a dilute solution of sodium hydroxide, which liberates as a free base the desired 2-methoxy - 6 - chloro - 9 - [2'-hydroxy-2'-methyl-3'-(methyl-n - propylamino)propylamino]acridine, which has the following formula:

(5) 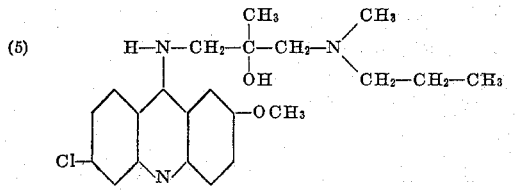

This free base is recovered by extraction with ether, and is converted to its dihydrochloride by passing hydrogen chloride gas through the ether solution. The dihydrochloride melts at 160–163° C.

Example 2.—2-methoxy - 6 - chloro-9-[2'-hydroxy-3'-(n - propyl - isopropylamino)propylamino]acridine, and its dihydrochloride.

To a solution of 40.4 g. of n-propyl-isopropyl-amine in 100 cc. of methoxyethanol, 38.6 g. of epichlorohydrin (1-chloro-2,3-epoxypropane) is added dropwise, with cooling. The resulting solution is permitted to stand overnight, and a solution of 74 g. of potassium phthalimide and 5 g. of potassium iodide in 75 cc. of methoxyethanol is added to it. The mixture is then heated and stirred in an oil bath at 130° C. for six hours. The solvent is removed by vacuum distillation, and the residue is dissolved in dilute hydrochloric acid and then filtered. The filtrate is made basic, as with sodium hydroxide solution, which causes the formation of a precipitate, which is collected. It is 2-hydroxy-3-(n-propyl-iso-propylamino)propylphthalimide. This is hydrolyzed by refluxing it for 8 hours with a mixture 150 cc. of concentrated hydrochloric acid and 100 cc. of water. Phthalic acid precipitates and is removed by filtration. The filtrate is evaporated to dryness, and a 12.5 N sodium hydroxide solution is added. This liberates as a free base the desired 2-hydroxy-3-(n - propyl - iso - propylamino)propylamine, which has the following formula:

(6) 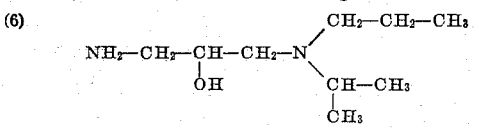

This is extracted with ether, dried, and recovered from the ether solution by distillation.

A solution of 10 g. of this diamine of Formula 6 and 14 g. of 2-methoxy-6,9-dichloroacridine in 50 cc. of phenol is stirred and heated on a steam bath for three hours. The reaction mixture is made basic with a dilute solution of sodium hydroxide, which liberates as a free base the desired 2-methoxy-6-chloro-9 - [ 2'-hydroxy-3'-(n-propyl-iso-propyl - amino)propylamino]acridine, which has the following formula:

(7) 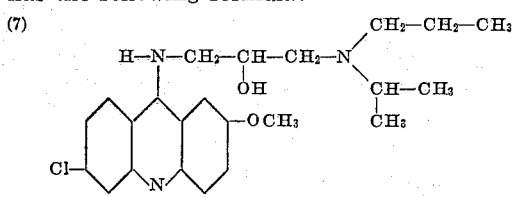

This is recovered by extraction with ether, and is converted to its dihydrochloride by treating the ether solution with hydrogen chloride. The dihydrochloride precipitates, and is recrystallized from alcohol-ether. When so purified, the dihydrochloride melts at 205–208° C.

Example 3.—2-methoxy-6-chloro - 9 - [2' - hydroxy-3'-(n-butylethylamino)propylamino] acridine, and its dihydrochloride.

To a solution of 50.5 g. of n-butylethylamine in 100 cc. of methanol, 46.3 g. of epichlorohydrin is slowly added, with cooling. The solution is permitted to stand overnight, and the methanol is then removed by vacuum distillation. The residue is added to a mixture of 92 g. of potassium phthalimide, 10 g. of potassium iodide, and 250 cc. of methoxyethanol. This mixture is heated in an oil bath at 130° C. and stirred for seven hours. The solvent is removed by vacuum distillation, and the residue is extracted with dilute hydrochloric acid. The extract is filtered and the filtrate is made basic with ammonium hydroxide. This liberates 2-hydroxy-3-(n-butylethylamino)-propylphthalimide, in the form of an oil, which slowly crystalizes on standing.

A solution of 60 g. of this phthalimide in 100 cc. of concentrated hydrochloric acid and 50 cc. of water is refluxed for 6½ hours. Phthalic acid precipitates, and is removed by filtration. The filtrate is evaporated to dryness, and an excess of sodium hydroxide solution is added. This liberates crude 2-hydroxy - 3 - (n-butylethylamino)-propylamine, which is extracted with ether and dried.

A solution of 10 g. of this crude diamine and 14 g. of 2-methoxy-6,9-dichloroacridine in 50 cc. of phenol is heated and stirred on a steam cone for 2½ hours. The reaction mixture is made basic with dilute sodium hydroxide solution, which liberates as a free base the desired 2-methoxy-6-chloro - 9 - [2'-hydroxy-3'-(n-butylethylamino) - propylamino] acridine, which has the following formula:

(8) 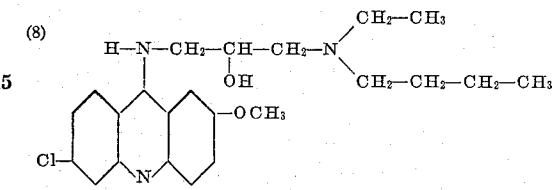

This is recovered by extraction with ether, and is converted to its dihydrochloride by treating the ether solution with hydrogen chloride. The dihydrochloride melts at 199–201° C.

Example 4.—2-methoxy-6-chloro- 9 - [ 2' - hydroxy-3' - (methyl-n-propylamino)propylamino] acridine, and its dihydrochloride.

Example 2 is repeated, save that instead of using n-propyl-iso-propylamine, we use methyl-n-propylamine, and successively produce: 2-hydroxy- 3 -(methyl-n-propylamino)propylphthalimide, 2-hydroxy-3-(methyl-n-propylamino) propylamine, and 2 - methoxy-6-chloro- 9 - [2'-hydroxy- 3' -(methyl-n-propylamino)propylamino] acridine, which has the following formula:

(9) 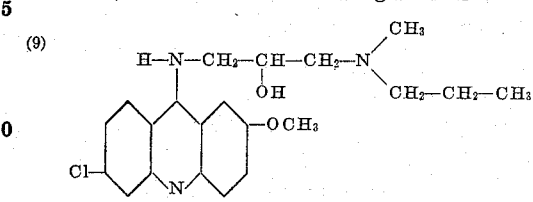

This substituted acridine is converted to its dihydrochloride, which melts at 153–156° C.

*Example 5.*—2-methoxy-6-chloro-9-[2'-hydroxy-2'-methyl-3'-(ethylcyclopentylamino)propylamino]acridine, and its dihydrochloride.

Ethylcyclopentylamine may be prepared from a mixture of ethylamine and cyclopentanone by reduction with hydrogen in the presence of Raney nickel catalyst at about 100° C. and a hydrogen pressure of about 1500 p. s. i. The reaction mixture is separated from the catalyst and dstilled. The fraction boiling at 119-120° C. at 29 mm. pressure is collected, and is the desired ethylcyclopentylamine.

This amine is condensed with β-methyl-epichlorohydrin, and is then converted to 2-hydroxy-2-methyl-3-(ethylcyclopentylamino) propylamine, by the procedure of Example 1.

By the procedure of the preceding examples, this diamine is then condensed with 2-methoxy-6,9-dichloroacridine, to produce 2-methoxy-6-chloro-9-[2'-hydroxy-2'-methyl-3'-(ethylcyclopentylamino)propylamino]acridine, which has the following formula:

(10) 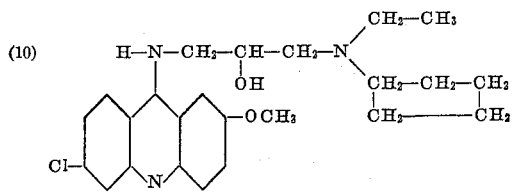

This may be recovered as a free base, or may be converted to its dihydrochloride, as in preceding examples.

*Example 6.*—Examples 1 and 5 may be repeated, save that instead of the secondary amines used in those examples, we may use other secondary amines of Formula 2, to produce corresponding 2-hydroxy-2-methyl-3-(disubstituted amino)propylamines and 2-methoxy-6-chloro-9-[2'-hydroxy-2'-methyl-3'-(disubstituted amino) propylamino]acridines, and their dihydrochlorides.

*Example 7.*—Any of Examples 2, 3, and 4 may be repeated, save that instead of the secondary amines used in those examples we may use other secondary amines of Formula 2, to produce corresponding 2-hydroxy-3-(disubstituted amino)-propylamines and 2-methoxy-6-chloro-9-[2'-hydroxy-3'-(disubstituted amino)propylamino]acridines, and their dihydrochlorides.

*Example 8.*—Any of the preceding examples may be repeated, save that instead of converting the final substituted acridine to its dihydrochloride, we may form the dihydrobromide or other salts thereof, such for instance as the sulphate, the nitrate, the phosphate, the lactate, the propionate, etc.

Compounds of the type shown in Formula 1 above, and produced by the procedures of the various examples given above, have antimalarial value, either directly or in the form of salts of various acids.

We claim as our invention:

2-methoxy-6-chloro-9-[2'-hydroxy-3'-(ethyl-n-butylamino)-propylamino]-acridine having the following formula:

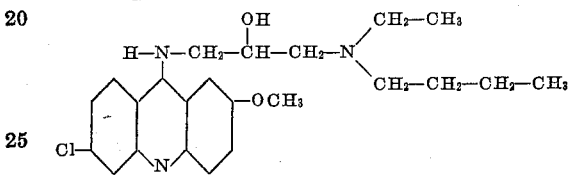

and its salts.

HORACE A. SHONLE.
JOSEPH W. CORSE.

REFERENCES CITED

The following references are of record in the file of this patent:

UNITED STATES PATENTS

| Number | Name | Date |
|---|---|---|
| 2,113,357 | Mietzsch | Apr. 5, 1938 |
| 2,160,058 | Cover | May 30, 1939 |

OTHER REFERENCES

Prelog et al., Helv. Chim. Acta, vol. 26, (1943), pages 11, 72–80. (Copy in Patent Office Library.)

Williams, "Chemotherapy of Malaria," (published by Lederle Laboratories, Inc., N. Y., June 1941), pages 216–19. (Copy in the Patent Office Library.)